July 31, 1962 S. E. KONDI 3,047,841
MARGINAL CHECKING MEANS FOR ELECTRICAL PULSE CIRCUITS
Filed Aug. 26, 1959

INVENTOR.
S. ERIC KONDI
BY Henry L. Hanson
ATTORNEY

3,047,841
MARGINAL CHECKING MEANS FOR ELECTRICAL PULSE CIRCUITS
Spiro Eric Kondi, Belmont, Mass., assignor to Minneapolis-Honeywell Regulator Company, Minneapolis, Minn., a corporation of Delaware
Filed Aug. 26, 1959, Ser. No. 836,092
7 Claims. (Cl. 340—167)

A general object of the present invention is to provide a new and improved marginal checking means for an electrical pulse handling circuit. More specifically, the present invention is concerned with a new and improved electrical apparatus for marginal checking a data processing circuit wherein the marginal checking means is characterized by the circuit having a high checking power which may be provided at a cost considerably less than has been realized in marginal checking circuits heretofore known.

In electrical pulse handling and manipulating circuits, particularly those associated with electronic data processing apparatus, it is frequently necessary to check the circuits to determine if they are operating and if the circuits are operating marginally such that a failure may either be intermittent or imminent if the circuit is continued in operation. It has been the practice to provide some type of marginal check for such circuitry which will enable an operator either to automatically or manually determine the operating characteristics of the circuit. The most commonly known form of marginal check involves the use of varying the amplitude of the operating voltages in the circuit so that a failure of a weak component in the circuit can be forced. While variations of the signal voltages applied to the electronic components will produce a certain amount of marginal check for the circuit, the implementation of this type of marginal check can be fairly expensive when it is realized that a complete marginal check will require the variation of both primary and secondary voltage sources in the circuit. Another difficulty encountered in marginal checking schemes using varying voltages is that in many pulse handling circuits only a fraction of the output signal amplitude from any one stage is required or used in the next stage. Consequently, relatively large circuit operational voltage swings are required in order to provide an effective marginal check.

Many types of electrical data processing circuits operate under the control of a synchronizing or timing clock signal, which may take the form of an electrical pulse or the like. The signal from the electrical clock is applied to the circuitry to activate the circuit at a predetermined time instant which is generally related to the flow of information signals within the circuit. The electrical timing clock signal may serve to synchronize an entire segment of a data processing circuit so that information may be stepped through the circuit in a predetermined time fashion or the timing signal may function only to activate a single circuit and provide a means for establishing a standard output signal from the circuit if there is a predetermined input associated with the circuit.

In accordance with the teachings of the present invention, the marginal checking of an electronic circuit can be realized by varying the phasing or timing of a clock signal applied to the circuit. By utilizing a phase variation in the timing clock pulse it is possible to bring about a substantially direct response of the circuit to adjustments in phase. In other words, the phase margins of the clock pulses in the circuit are much more critical or tight than is the case with operating voltages. Consequently, the circuits are more directly affected by such a phase adjustment, and a highly powerful marginal check can be realized.

It is therefore a further more specific object of the present invention to provide a new and improved marginal checking means for an electrical circuit which comprises a variable phase timing signal for the circuit.

A further more specific object of the invention is to provide a new and improved information handling circuit wherein a timing signal source has associated therewith a variable time delay device to effect a variation in the timing of the signal applied thereto in order to force a failure upon the circuit in the event that a portion of the circuit is weak and about to fail.

In a data processing system wherein there are a large number of circuits requiring marginal check, it is essential that means be provided for isolating the check so as to be able to localize any troublesome areas in the system which may be about to fail. As taught in the present invention, a selection matrix is provided whereby it is possible to uniquely connect a timing clock to selected sections of a data processing system in order to localize the areas where there may be potential problems.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
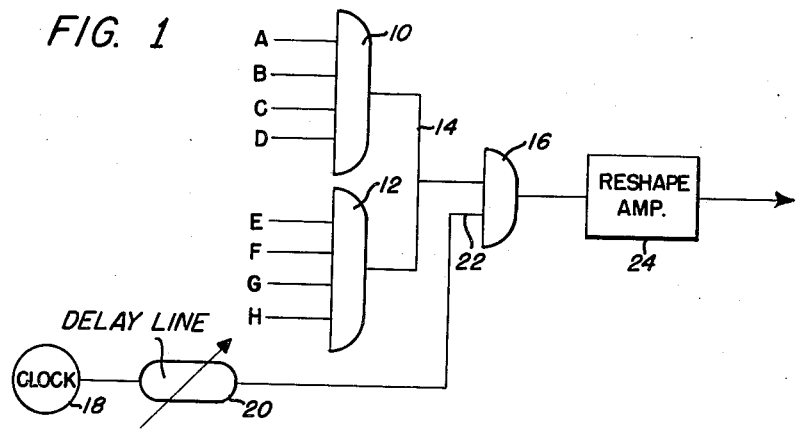
FIGURE 1 is a diagrammatic representation of a single logical circuit incorporating the principles of the present invention.

Referring first to FIGURE 1, there is here illustrated a repersentative form of logical circuit of the type found in electronic data processing systems. This circuit includes a pair of gating sections 10 and 12 having a plurality of inputs A through H. The functions represented by the signals A through H are adapted to produce signals on the output of the respective gating circuits when the desired combination of inputs are present. The gating circuits 10 and 12 are buffered together on a buffer line 14, the output of which is connected to a further gating circuit 16. The gating circuit 16 has an additional input derived from a timing clock source 18, the latter of which has its output coupled by way of adjustable phasing device 20 to an input gate leg 22 on the gate 16.

The output of the gate 16 is coupled to a reshape amplifier 24, the latter of which is adapted to produce the desired output signals in accordance with the presence or absence of signals passed through the input gate 16.

The logical circuitry and reshape amplifier circuitry shown diagrammatically in FIGURE 1 may take the form of the logical circuitry illustrated and described in an article entitled "Packaged Logical Circuitry for a 4 mc. Computer," by Norman Zimbel, as published in the Convention Record of the I.R.E., 1954, National Convention, Part IV.

In considering the operation of the circuitry illustrated in FIGURE 1, it should be noted that if the functions A through D are all active on the input of the gate 10, a signal will be passed through the gate to the buffer line 14 and then to the input gate leg of the gate 16. When the signal from the gate 10 is applied to the gate 16, it is normally desired that a clock signal from the clock source 18 be coupled to the input gate leg 22 of the gate 16. The clock signal on the gate leg 22 is sometimes referred to as a reshape signal, and the occurrence of the signal with the information signal serves to retime the input to reshape amplifier. When both of the input signals are present on the two gate legs of the gate 16, the reshape amplifier will produce an output pulse which will receive its primary timing from the clock 18. A more detailed analysis of this operation will be found in the abovementioned article by Norman Zimbel.

Inasmuch as it is frequently necessary to provide for an accurate analysis on the operability of the circuit, a marginal checking feature has been added to ensure that a weakness in any of the gating circuitry or in the reshape amplifier will be detected. Instead of varying the amplitude of the operating voltages in the circuitry, the present invention involves changing the phasing or the timing of the signals received from the clock 18. The variable phasing or variable time delay may be effected by way of the adjustable delay network 20 which is positioned between the clock 18 and the output gate leg 22.

Figure 3:
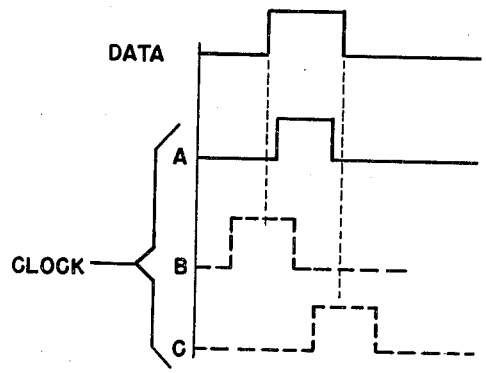
FIGURE 3 illustrates representative wave forms which may be associated with the operation of the circuitry of FIGURE 1 and FIGURE 2.

As viewed in FIGURE 3, the pulses associated with the gate 16 are a data pulse and a clock pulse. By pre-arrangement, the timing clock pulse will normally occur at the instant that it is desired for a data pulse to pass into the reshape amplifier. Thus, the clock pulse at A occurs at the same time as the data pulse, and since it is a pulse which is narrower than the data pulse, the reshape amplifier output will tend to take the form of the clock pulse.

In order for the reshape amplifier to operate properly, it is essential that there be a predetermined overlap between the clock pulse and the data pulse received from the input logical circuitry. If there is not a predetermined overlay or overlap between the two signals, the circuit will fail to produce an output, and this may serve to indicate a failure of the circuit. Thus, for example, if the clock pulse is advanced in time phase as indicated at B in FIGURE 3, the overlap between the data pulse and the clock pulse will be decreased considerably and, at some predetermined point, the reshape amplifier will no longer be able to respond to the data and the clock pulse. Similarly, if the clock pulse is delayed in time, as indicated at C in FIGURE 3, there will be a gradual decrease in the amount of overlap between the data pulse and the clock pulse such that once again the circuit may be caused to fail.

It has been found that with a predetermined shifting of the clock pulse with respect to the data pulse, a logical circuit which is weak either in the input logic or in the reshape amplifier will become inoperative, and whether or not the circuit becomes inoperative will be a function of whether the circuit has weak components therein. In addition to checking for weak components, this marginal checking technique provides a check for variations in the signal levels associated with the data, as well as operating voltage levels for the gating circuits and the amplifier.

It will be readily apparent that the implementation of this type of circuit can be realized by providing a variable time delay network in the network 20, or some other suitable variable time device, so as to ensure that the circuit is capable of shifting the clock pulse with respect to the data in the manner indicated in FIGURE 3.

Figure 2:
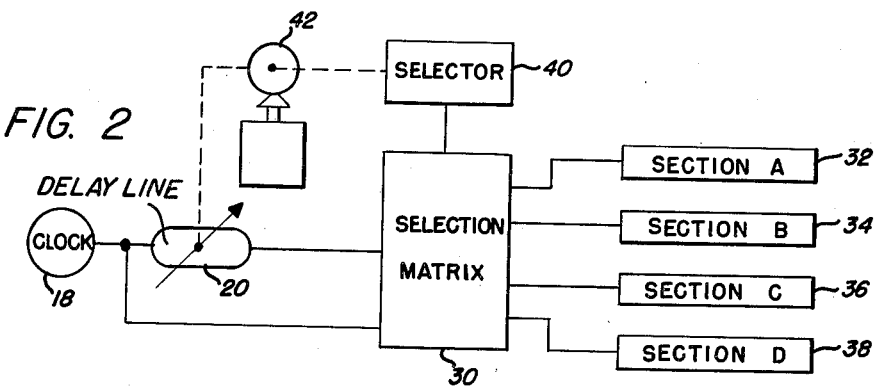
FIGURE 2 is a diagrammatic representation of a data processing system incorporating the principles of the invention.

Referring next to FIGURE 2, there is here illustrated one manner in which the teachings of the present invention may be applied to a data processing system where there may be a plurality of sections or circuits requiring individual examination. Included in the apparatus illustrated in FIGURE 2 is the clock 18 and the variable timing or phasing device 20 which may correspond to the units described above in connection with FIGURE 1. In addition, there is provided a selection matrix 30 which is adapted to transfer the clock signals from the source 18 therethrough to a selected one or more of the output sections 32, 34, 36, and 38. The control of the selection matrix 30 may be by an appropriate selector mechanism 40. The selection matrix 30 may take the form of a crossbar type switch well known in the telephone art, or a suitable electronic switching array which provides a desired unique selection of an output line in accordance with an input address supplied by the selector 40. The selector 40 and the variable phasing device 20 may be automatically driven, as by a control motor, illustrated generally at 42.

In considering the operation of the apparatus illustrated in FIGURE 2, it should be noted that the checking to be performed on each section is comparable to the checking described above in connection with FIGURE 1. In this case, however, the data processing system is divided into sections, each of which is adapted to be tested or checked in a predetermined sequence. When a particular selection signal is received from the selector 40, the selection matrix 30 will select, for example, section A. Once this particular section has been selected, the phasing of the clock signals will be varied with the variable phasing network 20, and these clock signals will be applied to the section A. In actual practice, the phasing of the timing clock is adjusted so that if the components of the section are within desired tolerances and the operating voltages are likewise within the desired tolerances, the adjustment of the phase of the timing clock will not produce any indication of failure in the circuit. However, if there is a weak component in the circuit, the adjustment of the clock will provide an indication of failure by reason of the circuit under examination not passing a signal when it should be passing a signal.

After the first section has been checked, the next section of the series will be selected by way of the selector 40 in the matrix 30, and a corresponding adjustment of the phase of the clock signal will be effected. A similar operation will take place with respect to the other sections of the data processor, and a failure of any one of the circuits may be appropriately indicated to an operator, or a failure signal may be utilized to stop the programming motor 42.

It will be readily apparent that the principles of the present invention may be extended further than just to the illustrated system. For example, the marginal checking may be effected automatically in the data processing system between programs or at break points within a program to ensure that the data processor can be continued in operation without the danger of an error.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. An electrical circuit comprising an amplifier having an input and an output, a pulse-type logical circuit connected to said input, a timing clock pulse source connected to said input and being adapted to produce a single clock pulse for each signal pulse passed through said logical circuit to control the activation of said amplifier when a signal passes through said logical circuit and selectively adjustable means connected to said clock pulse source to adjust the timing of each clock pulse from said source at said input relative to the pulse signal passing through said logical circuit so that the time period of coincidence of said clock pulse and said signal pulse is varied to thereby provide a check of the operability of said circuit.

2. An electrical circuit comprising an amplifier having an input and an output, a logical circuit connected to said input and being adapted to pass signals at a selected repetition rate, a timing signal source having timing signals occurring at said repetition rate connected to said input, and selectively adjustable means connected to said clock source to adjust the phasing of each signal from said source at said input relative to the signals from said logical circuit to effect a variation in the duration of the simultaneous occurrence of said signals and timing signals and thereby provide a check of the operability of said circuit.

3. An electrical circuit comprising a pulse reshape amplifier having an input and an output, said amplifier being adapted to pass sequentially positioned digital pulses at a predetermined repetition rate, a pulse-type logical circuit connected to said input, a reshape pulse source connected to said input and having output pulses occurring at said repetition rate, and selectively and linearly adjustable means connected to said reshape pulse source to adjust the timing of each pulse from said source at said input relative to the timing of each digital pulse to thereby provide a check of the operability of said circuit.

4. In combination, a pulse reshape amplifier adapted to pass digital pulses occurring at a predetermined repetition rate, a clock pulse source having clock pulses occurring at said repetition rate connected to said amplifier, and a marginal checking means for said amplifier connected to said clock pulse source, said checking means comprising means to vary selectively and linearly the timing of the clock pulses of said clock pulse source relative to said digital pulses.

5. In combination, a pulse reshape amplifier, a logical input connected to said amplifier and being adapted to pass digital pulses occurring at a predetermined repetition rate, a clock pulse source having clock pulses occurring at said repetition rate connected to said amplifier and adapted to be gated with said logical input, and a marginal checking means for said amplifier connected to said clock pulse source, said checking means comprising means to vary selectively linearly the timing of the clock pulses from said clock pulse source relative to said digital pulses.

6. In combination, a pulse reshape amplifier, a clock pulse source connected to said amplifier and having a clock pulse output whose repetition frequency is the same as the pulse amplification rate of said amplifier, and a marginal checking means for said amplifier connected to said clock pulse source, said checking means comprising a selectively variable time delay means for varying the relative time coincidence of the clock pulses from said clock pulse source and the pulses to be amplified by said amplifier.

7. A marginal checking means for a data processor comprising a plurality of data processing circuits, each of which comprises pulse manipulating circuitry having a clock pulse input, said circuitry being adapted to pass digital pulses at the same rate as the clock pulse input, a clock pulse source, variable phase control means connected to said clock pulse source to vary linearly the phase relationship between the clock pulses and the digital pulses, and means selectively connecting said clock pulse source to selected ones of said plurality of data processing circuits.

References Cited in the file of this patent
FOREIGN PATENTS
202,162     Australia _____ June 13, 1956